United States Patent
Weng et al.

(10) Patent No.: US 11,177,476 B2
(45) Date of Patent: Nov. 16, 2021

(54) COMPLEXED IODINE-BASED ELECTROLYTE AND REDOX FLOW BATTERY COMPRISING THE SAME

(71) Applicant: The Chinese University of Hong Kong, Hong Kong (CN)

(72) Inventors: Guoming Weng, Zhuhai (CN); Yi-Chun Lu, Hong Kong (CN); Zengyue Wang, Hong Kong (CN); Simon Long Yin Tam, Hong Kong (CN)

(73) Assignee: The Chinese University of Hong Kong, Hong Kong (CN)

( * ) Notice: Subject to any disclaimer, the term of this patent is extended or adjusted under 35 U.S.C. 154(b) by 115 days.

(21) Appl. No.: 16/558,814

(22) Filed: Sep. 3, 2019

(65) Prior Publication Data

US 2020/0075952 A1    Mar. 5, 2020

Related U.S. Application Data

(60) Provisional application No. 62/726,542, filed on Sep. 4, 2018.

(51) Int. Cl.
| | | |
|---|---|---|
| *H01M 4/00* | (2006.01) | |
| *H01M 4/58* | (2010.01) | |
| *H01M 8/18* | (2006.01) | |
| *H01M 4/36* | (2006.01) | |

(52) U.S. Cl.
CPC ............ *H01M 4/582* (2013.01); *H01M 4/368* (2013.01); *H01M 8/188* (2013.01); *H01M 2300/0002* (2013.01); *H01M 2300/0025* (2013.01)

(58) Field of Classification Search
CPC ................... Y02E 60/50; Y02E 60/10; H01M 2300/0025; H01M 8/188; H01M 4/368; H01M 2300/0002
See application file for complete search history.

(56) References Cited

U.S. PATENT DOCUMENTS

| | | | |
|---|---|---|---|
| 9,318,772 B2 * | 4/2016 | Schumann | H01M 10/0568 |
| 2018/0079721 A1 | 3/2018 | Armand et al. | |
| 2018/0175470 A1 | 6/2018 | Bai et al. | |
| 2019/0221891 A1 * | 7/2019 | Lockett | H01G 11/04 |
| 2019/0363387 A1 * | 11/2019 | Selverston | H01M 8/0239 |

OTHER PUBLICATIONS

Weng et al., "Unlocking the capacity of iodide for high-energy-density zinc/polyiodide and lithium/polyiodide redox flow batteries," Energy Environ, Sci., 2017, 10:735-741.

* cited by examiner

*Primary Examiner* — Cynthia H Kelly
*Assistant Examiner* — Monique M Wills
(74) *Attorney, Agent, or Firm* — Fish & Richardson P.C.

(57) ABSTRACT

The disclosure relates to a complexed iodine-based electrolyte, a redox flow battery comprising the complexed iodine-based electrolyte, and a method for producing the redox flow battery.

17 Claims, 6 Drawing Sheets

COMPLEXED IODINE-BASED ELECTROLYTE AND REDOX FLOW BATTERY COMPRISING THE SAME

TECHNICAL FIELD

The disclosure relates to a complexed iodine-based electrolyte, a redox flow battery comprising the complexed iodine-based electrolyte, and a method for producing the redox flow battery.

BACKGROUND

An energy storage system is a crucial means for the application of intermittent renewable energy sources such as solar energy or wind energy. At present, a redox flow battery (RFB) is one of the most promising technologies for use in such energy storage system, and for other applications such as grid-scale energy storage and electric vehicle applications, owing to its design flexibility in decoupling power and energy.

However, the broader application of the conventional RFB has been limited by its limited energy density and the use of corrosive electrolytes. For instance, the energy densities of the practical all vanadium redox flow battery and zinc-bromine hybrid flow battery are both less than 60 Wh/L$_{positive+negative}$. Moreover, these two systems utilize corrosive electrolytes containing highly concentrated acid and toxic bromine. Since a RFB having higher energy density will reduce the floor space of the system and become more advantageous for stationary or movable station, transport, etc., there is still a need for development of an active electrolyte that could be used to manufacture a redox flow batter with high energy density, low cost and environment friendliness.

In order to develop such an active electrolyte, iodide/triiodide ($I^-/I_3^-$) couple is considered as one of the most promising redox-active species due to its high solubility (which leads to high energy density), high safety and low cost. The oxidation of iodide to iodine is often described in two steps via the formation of triiodide ($I_3^-$) (Eqn. 1 and Eqn. 2). Eqn. 2 is an equilibrium reaction with large equilibrium constant i.e., the concentration of free iodine ($I_2$) is very low in the presence of excess iodide ($I^-$). The free iodine is stabilized by the iodide ion in the solution to form the triiodide (Eqn. 2). Upon further oxidation, the last one-third of the iodide is oxidized to $I_2$ (Eqn. 3) wherein no free iodide is available to stabilize the iodine, which causes iodine precipitation. Therefore, the Eqn. 3 is often observed not as reversible as the Eqn. 1. Due to the low reversibility of Eqn. 3, the application of iodide as the redox active species in the flow battery has been limited in the first step i.e., only ⅔ of the iodide ions contribute to useable capacity and ⅓ of the iodide ions are used as the complexing agent to stabilize the free iodine (Eqn. 4).

  (1)

  (2)

  (3)

  (4)

One such design has been developed in the art, which refers to a Zn—I flow battery (ZIB) using iodine-iodide positive electrolyte. However, to ensure high reversibility, one-third of the iodide ions are acting as complexing agent to stabilize iodine ($I_2$) instead of contributing to useful capacity.

In order to solve at least one of the above problems, the disclosure provides a novel complexed iodine-based electrolyte which fully utilizes the capacity of iodide ions by releasing iodide ions without forming irreversible free iodine.

SUMMARY

In one aspect, the disclosure provides a complexed iodine-based electrolyte, comprising an iodide moiety, a complexing agent and a solvent, wherein the complexed iodine-based electrolyte comprises complexed iodide ions during charging process, and comprises free iodide ions during discharging process, and wherein the complexing agent comprises a hetero-halide ion, a pseudohalide ion, a complexing molecule or a combination thereof.

In one embodiment, the hetero-halide ion may be selected from the group consisting of $F^-$, $Cl^-$, $Br^-$, $At^-$, and a combination thereof, and wherein if the hetero-halide ion is $Br^-$, the complexing agent is a combination of $Br^-$ with a complexing molecule. In another embodiment, the pseudo-halide ion may be selected from the group consisting of $SCN^-$, $OCN^-$, $CN^-$, $SeCN^-$, $TeCN^-$, $N_3^-$, $Co(CO)_4^-$, $C(CN)_3^-$, $CS_2N_3^-$ and a combination thereof. In yet another embodiment, the complexing molecule may be selected from the group consisting of activated carbon, polyvinylpyrrolidone (povidone, PVP), polysaccharides, polyoxyethylene (POE) or their derivatives and a combination thereof. In a further embodiment, the complexing molecule is selected from the group consisting of activated carbon, N-vinyl-2-pyrrolidone, starch, carboxymethyl starch sodium and a combination thereof. In that embodiment, the complexing molecules form a particle with a diameter of 0.1 μm to 10 μm.

In other embodiment, the solvent may be selected from the group consisting of water, acetone, ethanol, dimethyl sulfoxide (DMSO), acetonitrile, 1,3-dioxolane (DOL), 1,2-dimethoxyethane (DME), dyglyme, ethyl acetate, toluene, hexane, propylene carbonate (PC), ethylene carbonate (EC), dimethyl carbonate (DMC), diethyl carbonate (DEC) and a combination thereof.

In another aspect, the disclosure provides a redox flow battery, comprising the complexed iodine-based electrolyte as described above, and a counter electrolyte that could be dissolved or stably suspended in the solvent. In a further embodiment, the counter electrolyte may be selected from the group consisting of $V^{2+}/V^{3+}$, $Zn/Zn^{2+}$, $Zn/ZnO$, $Cu/Cu^{2+}$, $Ni/Ni^{2+}$, $Li/Li^+$, $K/K^+$, $Na/Na^+$, $Ce^{3+}/Ce^{4+}$, $Mg/Mg^{2+}$, $Al/Al^{3+}$, $S^{2-}/S^{4-}$, metal hydride ($MH_x/MH_{x-1}$), $Pb/Pb^{2+}$, $Pb^{2+}/Pb^{4+}$, $H_2/H^+$, $O_2/H_2O$, $O_2/OH^-$, (2,2,6,6-tetramethylpiperidin-1-yl)oxyl/hydroxylamine (2,2,6,6-tetramethylpiperidin-1-yl)oxyl, $LiC_6$/graphite, $Li_5T_4O_{12}$/$Li_4Ti_5O_{12}$, $Li_{1.5}Ti_2(PO_4)_3/Li_{0.5}Ti_2(PO_4)_3$, $LiNi_{0.5}Mn_{1.5}O_4$/$Ni_{0.5}Mn_{1.5}O_4$, $LiMn_2O_4/MnO_2$ and a combination thereof.

In an embodiment, the redox flow battery may further comprise an acid or a base. In another embodiment, the acid may be selected from the group consisting of HCl, $H_2SO_4$, $H_3PO_4$, $HNO_3$, $H_2CO_3$, $C_6H_5COOH$ and a combination thereof. In another embodiment, the base may be selected from the group consisting of NaOH, LiOH, KOH, $NH_4OH$ and a combination thereof.

In an embodiment, the redox flow battery comprises a single cell or a stack of cell, in which each cell comprises two half-cells, wherein one half-cell comprises the complexed iodine-based electrolyte and the other half-cell comprises the counter electrolyte, and wherein the two half-cells are separated by an ion-exchange membrane, a porous membrane or a solid-state ionic conductive ceramic. In another embodiment, the redox flow battery uses aqueous electrolyte, which has an energy density of more than 101 Wh/L$_{positive+negative}$. In a further embodiment, at least one half-cell of the redox flow battery uses nonaqueous electrolyte, and the redox flow battery has an energy density of 140-750 Wh/L$_{positive+negative}$.

In still another aspect, the disclosure provides a complexing agent for the complexed iodine-based electrolyte as described above, wherein the complexing agent comprises a moiety X and a counter moiety M, in which the moiety X may form complexed iodide ions I$_2$X during charging process of the complexed iodine-based electrolyte, and may form free X during discharging process of the complexed iodine-based electrolyte, and wherein the moiety X may be selected from the group consisting of a hetero-halide ion, a pseudohalide ion, a complexing molecule and a combination thereof.

In an embodiment, the hetero-halide ion may be selected from the group consisting of F$^-$, Cl$^-$, Br$^-$, At$^-$ and a combination thereof, and wherein if the hetero-halide ion is Br$^-$, the moiety X is a combination of Br$^-$ with a complexing molecule. In another embodiment, the pseudohalide ion may be selected from the group consisting of SCN$^-$, OCN$^-$, CN$^-$, SeCN$^-$, TeCN$^-$, N$_3^-$, Co(CO)$_4^-$, C(CN)$_3^-$, CS$_2$N$_3^-$ and a combination thereof. In yet another embodiment, the complexing molecule may be selected from the group consisting of activated carbon, polyvinylpyrrolidone (povidone, PVP), polysaccharides, carboxymethyl starch sodium, polyoxyethylene (POE) or their derivatives and a combination thereof. In that embodiment, the complexing molecules form a particle with a diameter of 0.1 μm to 10 μm. The complexing molecules are macromolecules with moiety complexing with iodine. Compared to bromide ion, the complexing molecules reduce materials cost, enable low-cost high-power porous separator, and also improve safety of the flow battery system.

BRIEF DESCRIPTION OF DRAWINGS

Embodiments illustrated herein are further described in the following description in conjunction with the accompanying drawings. However, the accompanying drawings are only provided to enable those skilled in the art to better understand the disclosure, rather than limit the scope of the disclosure.

DETAILED DESCRIPTION

Figure 1:
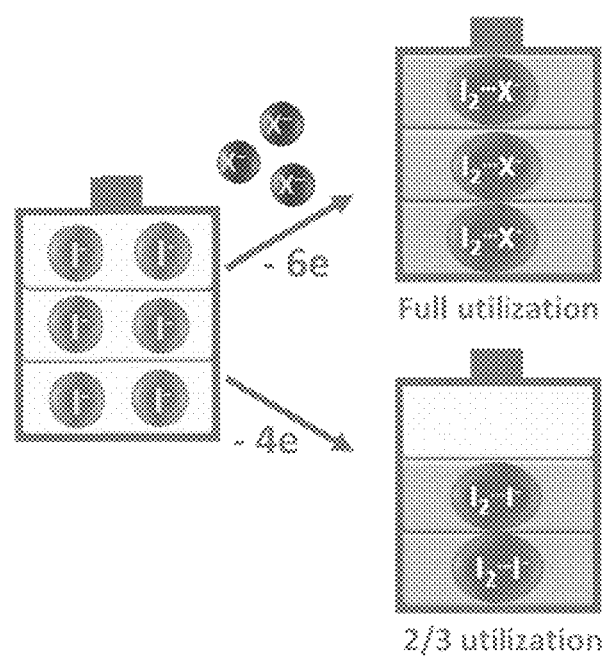
FIG. 1 is a conceptive illustration of the complexed iodine-based electrolyte of the disclosure as compared with the iodide/triiodide (I$^-$/I$_3^-$) electrolyte.

The disclosure will be further illustrated by the following specific embodiments. However, the specific embodiments are listed for illustrative purposes only, and not intended to limit the disclosure. As will be appreciated by those skilled in the art, specific feature(s) according to any one of the following embodiments may be used in any other embodiments without deviating from the spirit of the disclosure.

In some embodiments, the complexed iodine-based electrolyte comprises an iodide moiety, a complexing agent and a solvent, wherein the complexed iodine-based electrolyte comprises complexed iodide ions during charging process, and comprises free iodide ions during discharging process. The complexing agent is used herein to solubilize and stabilize iodine molecules in the electrolyte by forming an iodine-based complex during the charging process and releasing free iodide ions during the discharging process. For example, before the first charging process, the complexed iodine-based electrolyte is a mixture of iodide ions and the complexing agent in the solvent.

In some embodiments, the complexing agent comprises a hetero-halide ion, a pseudohalide ion, a complexing molecule or a combination thereof. In further embodiments, the hetero-halide ion may be selected from the group consisting of F$^-$, Cl$^-$, Br$^-$, At$^-$ and a combination thereof. In other further embodiments, the hetero-halide ion is selected from the group consisting of F$^-$, Cl$^-$, At$^-$ and a combination thereof. The inventors have discovered the use of bromide ions as a complexing agent to stabilize the iodide ions, and further discovered many complexing agent species, including pseudohalides and complexing molecules, that could also stabilize iodine and achieve much better effects beyond the bromide ions. For example, the combination of hetero-halide ion such as bromide ion with a complexing molecule could achieve better effect than alone hetero-halide ion.

In some embodiments, the pseudohalide ion may be selected from the group consisting of SCN$^-$, OCN$^-$, CN$^-$, SeCN$^-$, TeCN$^-$, N$_3^-$, Co(CO)$_4^-$, C(CN)$_3^-$, CS$_2$N$_3^-$ and a combination thereof.

In some embodiments, some macromolecules are used as complex agent. Such molecules have adsorption effect to iodine, which will reduce the free I$_3^-$ in electrolyte. This effect reduces cross-over of the iodine species and improves coulombic efficiency. The solid particles with diameter between 0.1-10 μm can be easily filtered by micro-porous membrane. This allows low-cost, high conductivity micro-porous separator to be used in ZIBB systems, which costs only 1/10 of the Nafion ion exchange membrane.

In other embodiments, the complexing molecule may be selected from the group consisting of activated carbon, polyvinylpyrrolidone (povidone, PVP), polysaccharides, carboxymethyl starch sodium, polyoxyethylene (POE) or their derivatives and a combination thereof. Other complexing molecules can also be used herein, as long as they are soluble and have noncovalent interactions with iodine. In other embodiments, the complexing molecules may form particles, for example, solid particles, with a diameter of 0.1 μm to 10 μm, such as 0.5 μm, 1 μm, 2 μm, 3 μm, 4 μm, 5 μm, 6 μm, 7 μm, 8 μm, 9 μm, 10 μm, or any ranges between any two of these values. In such embodiments, the complexing molecules may have 2.5, 5, 10, 15, 20, 22.5 or 25 wt %.

The complexing molecules have following advantages over bromide ion:

1) Lower material cost. The complexing organic molecules consist of abundant elements on earth, which lower the price compared to iodine and bromine compounds.

2) Higher power density. The complexing molecules have large molecular weights, which enable low-cost size-selective separators to be used in flow batteries. Porous separators typically have higher conductivity compared to ion-exchange membrane (e.g., Nafion), which enables high areal power density.

3) Safety improvement. Over charging of iodide-bromine electrolyte will generate iodine and bromine gas, which is highly corrosive and toxic. The elimination of free iodine or bromine in electrolyte increases stability of electrolyte when overcharging happens, which improves security of the system.

As shown in FIG. 1, the complexing agent could stabilize the free iodine by forming complexed iodine-based ions ($I_2X$, also called iodophor) for the charging storage. During the discharging process, $I_2X^-$ is reduced to $I^-$ and $X^-$. The electrochemistry can be shown as Eqn. (5).

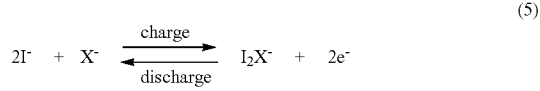

$$2I^- + X^- \underset{discharge}{\overset{charge}{\rightleftarrows}} I_2X^- + 2e^- \qquad (5)$$

In some embodiments, the complexed iodine-based electrolyte comprises counter species to neutralize the complexed iodine-based electrolyte. In further embodiments, the counter species could be positively-charged active species, for example, alkaline metal ions, alkaline-earth metal ions, ammonium ions, and other positively-charged active species commonly used in the art, such as Zn ions. The skilled person in the art could readily determine the appropriate positively-charged active species depending on actual operation.

In some embodiments, the solvent is selected from the group consisting of water, acetone, ethanol, dimethyl sulfoxide (DMSO), acetonitrile, 1,3-dioxolane (DOL), 1,2-dimethoxyethane (DME), dyglyme, ethyl acetate, toluene, hexane, propylene carbonate (PC), ethylene carbonate (EC), dimethyl carbonate (DMC), diethyl carbonate (DEC) and a combination thereof. The content of the solvent is not particularly limited, but preferably produce a concentration of iodide ions of 0.1-10M when the complexed iodine-based electrolyte releases all the iodide ions. In further embodiments, the concentration of iodide ions may be 0.1-10M, 1-9M, 1.5-8M, 2-7M, 2.5-6M, 3-5M, 3.5-4.5M or any combination thereof, and any values contained in these ranges.

In some embodiments, the redox flow battery comprises the complexed iodine-based electrolyte as described herein, and a counter electrolyte that is dissolved or stably suspended in the solvent. The counter electrolyte is not particularly limited, and can be selected from the group consisting of $V^{2+}/V^{3+}$, $Zn/Zn^{2+}$, $Zn/ZnO$, $Cu/Cu^{2+}$, $Ni/Ni^{2+}$, $Li/Li^+$, $K/K^+$, $Na/Na^+$, $Ce^{3+}/Ce^{4+}$, $Mg/Mg^{2+}$, $Al/Al^{3+}$, $S^{2-}/S^{4-}$, metal hydride ($MH_x/MH_{x-1}$), $Pb/Pb^{2+}$, $Pb^{2+}/Pb^{4+}$, $H_2/H^+$, $O_2/H_2O$, $O_2/OH^-$, (2,2,6,6-tetramethylpiperidin-1-yl)oxyl/hydroxylamine (2,2,6,6-tetramethylpiperidin-1-yl)oxyl, $LiC_6$/graphite, $Li_5T_4O_{12}/Li_4Ti_5O_{12}$, $Li_{1.5}Ti_2(PO_4)_3/Li_{0.5}Ti_2(PO_4)_3$, $LiNi_{0.5}Mn_{1.5}O_4/Ni_{0.5}Mn_{1.5}O_4$, $LiMn_2O_4/MnO_2$ and a combination thereof. The content of the counter electrolyte is depended on the content of the complexed iodine-based electrolyte, and could be readily determined by those skilled in the art.

In some embodiments, the redox flow battery further comprises an acid or a base, to adjust pH value of these electrolytes within range of 3-14, thereby improving the electrochemical performance by reducing hydrogen/oxygen evolution, preventing electrolyte decomposition and increasing ionic conductivity. In further embodiments, the acid may be selected from the group consisting of HCl, $H_2SO_4$, $H_3PO_4$, $HNO_3$, $H_2CO_3$, $C_6H_5COOH$ and a combination thereof. In still further embodiments, the base may be selected from the group consisting of NaOH, LiOH, KOH, $NH_4OH$ and a combination thereof. The content of the acid or base is not particularly limited, as long as appropriate pH value of these electrolytes can be achieved.

Figure 2:
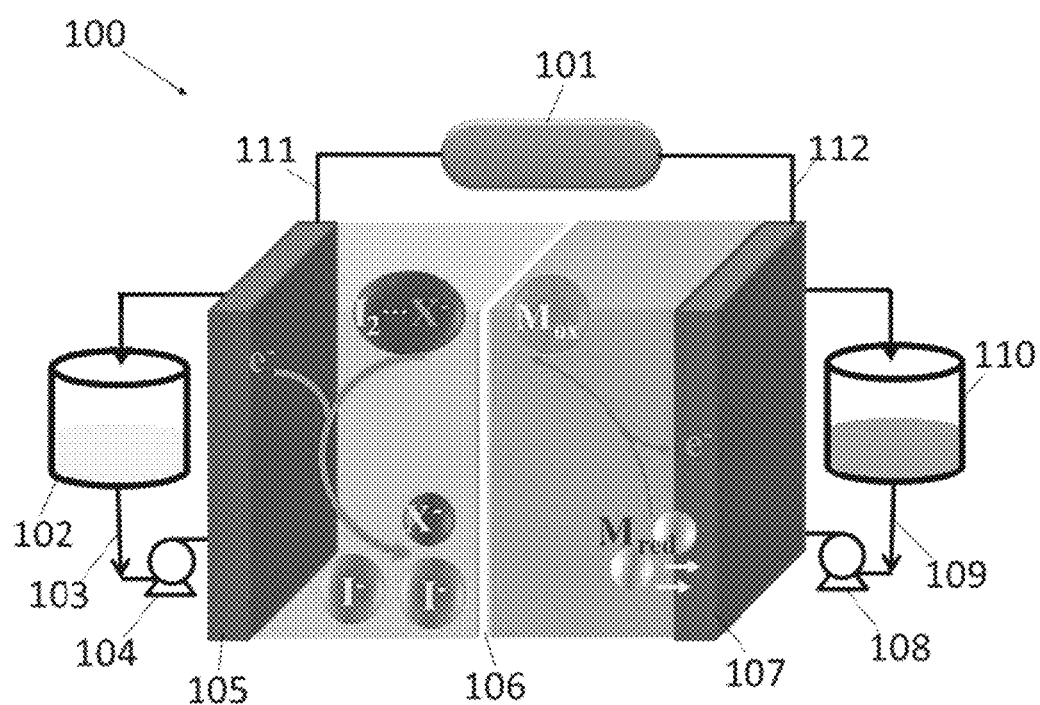
FIG. 2 is a schematic representation of the RFB configuration in accordance with one embodiment of the disclosure.

In some embodiments, the redox flow battery comprises a single cell or a stack of cell, in which each cell comprises two half-cells and a separator therebetween, and wherein one half-cell comprises the complexed iodine-based electrolyte and the other half-cell comprises the counter electrolyte. As shown in FIG. 2, RFB 100 can refer to a single cell using bipolar plate, wherein the cell comprises two half-cells (i.e. positive and negative compartments containing redox-active electrolyte and/or electrode), a separator avoiding short-circuiting and preventing crossover of active species, two external tanks storing corresponding electrolytes, and terminals allowing current to flow into and out of the cell. A half-cell can further comprise a current collector. The separator can include, but not limited to ion-exchange membrane (e.g. cation-exchange, anion-exchange or bipolar membrane), non-charged porous polymer membrane, non-charged porous inorganic membrane and ceramic membrane. In some embodiments, cation-exchange membrane, porous size-elective membrane and solid-state lithium ionic conductor can be used herein as the membrane and/or separator.

In particular embodiments, as shown in FIG. 2, the RFB 100 had two compartments, in which the first (left) compartment has a graphite-felt or carbon paper electrode plus current collector 105 immersed in the complexed iodine-based solution (its initial discharged state is a mixture solution of $I^-$ and X). The first (left) reservoir 102 can contain a supply of the complexed iodine-based solution, which can be circulated by the first (left) peristaltic or gear pump 104 through Teflon tubing 103 in a continuous or batch manner. The second (right) compartment has a counter redox-active electrolyte and a graphite-felt or carbon paper electrode plus current collector 107. The second (right) reservoir 110 can contain a supply of the counter redox-active solution, which can be circulated by the second (right) peristaltic or gear pump 108 through Teflon tubing 109 in a continuous or batch manner. The two compartments are separated by an ion-exchange membrane, non-charged porous polymer membrane, non-charged porous inorganic membrane, ceramic membrane or the combinations thereof 106. The two half cells can be connected via wires 111 and 112 to provide an electrical supply for a load 101. Upon charging, the $I_2X$ iodophor will be generated in the positive electrolyte while the M ions are reduced to form M metal on the negative electrode. Such process is accompanied by the movement of the M ions from the positive to negative side serving as the charge carrier. Upon discharging, the reverse reactions occur.

In some embodiments, the redox flow battery as described herein could yield high energy density and high-efficiency energy storage. In some embodiments, the experimental discharge energy densities of all the redox flow batteries of the disclosure are greater than 40 $Wh/L_{positive+negative}$. In some embodiments, the redox flow battery uses aqueous zinc electrolyte, which has an energy density of more than 101 $Wh/L_{positive+negative}$, such as 130, 150, 180, 200, 230, 250, 280 or 300 $Wh/L_{positive+negative}$. In another embodiments, at least negative half-cell of the redox flow battery uses nonaqueous electrolyte, which enables low-potential electrode material such as Li metal, graphite, LTO, biphenyl and dimethoxyethane, for wider voltage window of 2-3.5V. In further embodiments, the battery uses solid-state ionic conductive ceramic as separator, with aqueous or nonaqueous electrolyte on two half-cells, which enables both high voltage and high iodide solubility. The battery with 2-3.5V cell voltage and 1.5-8M dissolved iodine has an energy density of 140-750 $Wh/L_{positive+negative}$, such as 150, 200, 250, 300, 350, 400, 450, 500, 550, 600, 650 or 700 $Wh/L_{positive+negative}$.

For example, the bromide ions can be used as the complexing agent in the aqueous iodine-based electrolyte (i.e. a mixture of $ZnI_2$ and $ZnBr_2$ aqueous solution, initial state) which is used as positive electrolyte and $Zn/Zn^{2+}$ redox couple is used on the negative side (i.e. a mixture of $ZnI_2$ and $ZnBr_2$ aqueous solution). Two graphite felts are used as electrodes where redox reactions take place, and Nafion membrane is used as the separator. With equal volume of electrolyte on both positive and negative side of the battery, the experimental discharge energy of such battery system in flow mode can be up to 101 $Wh/L_{positive+negative}$ which is the highest energy density achieved experimentally for aqueous flow batteries. The similar or better effect can also be observed when the other complexing agents as described above are used. Herein, as for any sort of redox flow batteries described above, optimizing the electrolyte volume ratio between the positive and negative side of the flow battery further improves systematic energy density.

Figure 9:
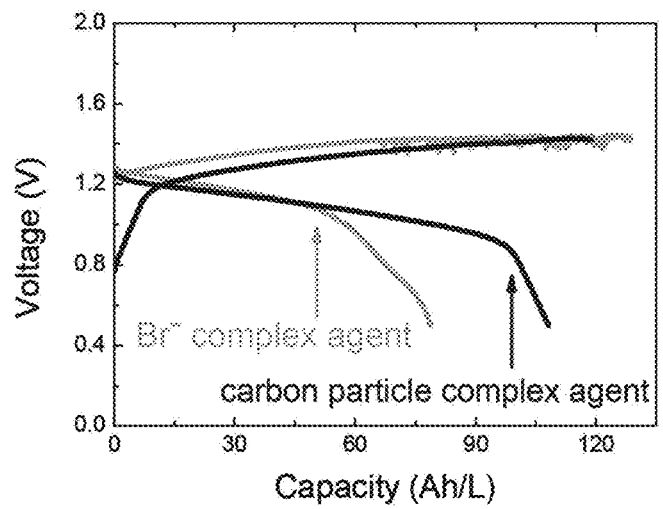
FIG. 9 shows a galvanostatic voltage profiles of the ZIBB system in accordance with one embodiment of the disclosure.
Figure 10:
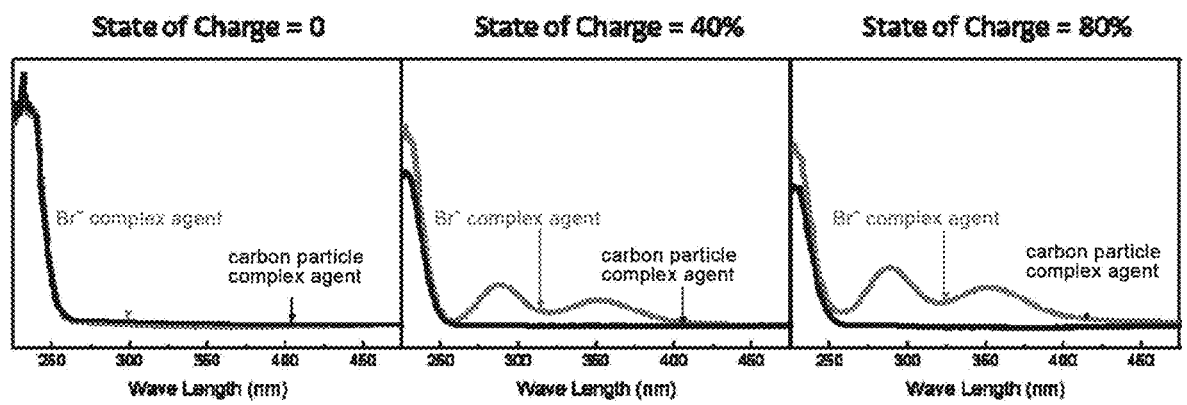
FIG. 10 shows UV-vis absorption spectrum of the ZIBB system in accordance with one embodiment of the disclosure.
Figure 11:
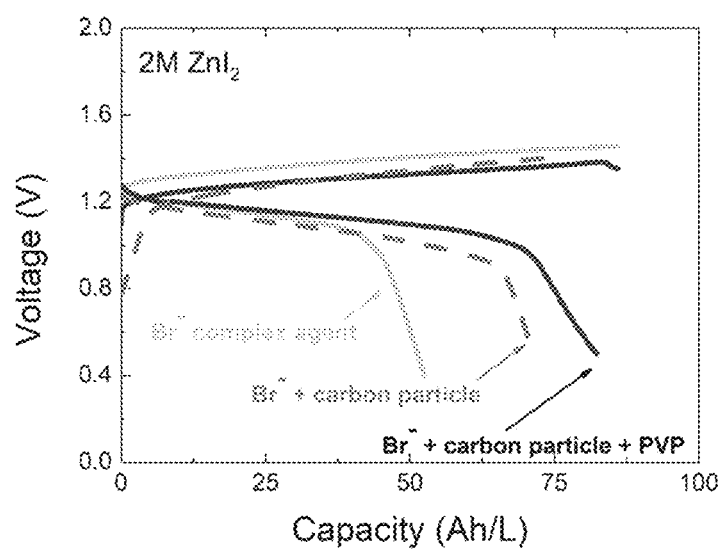
FIG. 11 shows galvanostatic voltage profiles the ZIBB system in accordance with one embodiment of the disclosure.

On the other hand, the bromide ions can be used as the complexing agent in the nonaqueous iodine-based electrolyte (i.e. a mixture of LiI and LiBr in binary solvents of DOL and DME) which is used as positive electrolyte and $Li/Li^+$ redox couple is used on the negative side (i.e. 1M LiTFSI in DOL and DME solution). In this case, the redox flow battery achieves a high cell voltage of about 3 V and a discharge energy density of >100 $Wh/L_{positive}$. In this case, it is possible to use a combination of bromide ions with complexing molecules as described herein, and such combination will achieve better effect than alone bromide ions, as shown in FIGS. 9-11.

As an example, $H_2/H^+$, (2,2,6,6-Tetramethylpiperidin-1-yl)oxyl/hydroxylamine (2,2,6,6-Tetramethylpiperidin-1-yl) oxyl, $S^{2-}/S^{4-}$, and $Li_{1.5}Ti_2(PO_4)_3/Li_{0.5}Ti_2(PO_4)_3$ can be used as negative redox-active species to couple with aqueous complexed iodine-based electrolyte which is used as positive redox-active couple. These battery systems show advantageous performance in terms of long cycle life and high energy density.

As another example, $Na/Na^+$, $K/K^+$, $Mg/Mg^{2+}$, $Al/Al^{3+}$, $LiC_6$/graphite, and $Li_5T_4O_{12}/Li_4Ti_5O_{12}$ can be used as negative redox-active species to couple with nonaqueous complexed iodine-based electrolyte which is used as positive redox-active couple. These battery systems show advantageous performance in terms of high cell voltage, high energy density and high efficiency.

As another example, $LiNi_{0.5}Mn_{1.5}O_4/Ni_{0.5}Mn_{1.5}O_4$ and $LiMn_2O_4/MnO_2$ can be used as positive redox-active species to couple with nonaqueous complexed iodine-based electrolyte which is used as negative redox-active couple. These battery systems show advantageous performance in terms of high cell voltage, high energy density and high efficiency.

In some embodiments, the complexing agent described herein comprises a moiety X and a counter moiety M, in which the moiety X forms complexed iodide ions $I_2X$ during charging process of the complexed iodine-based electrolyte, and forms free X ions during discharging process of the complexed iodine-based electrolyte. In further embodiments, the moiety X may be selected from the group consisting of a hetero-halide ion, a pseudohalide ion, a complexing molecule and a combination thereof, all of them have been described above and not repeated here. In further other embodiments, the counter moiety M may be alkaline metal ions, alkaline-earth metal ions, ammonium ions, and other positively-charged active species commonly used in the art, such as Zn ions. The skilled person in the art could readily determine the appropriate counter moiety M depending on actual operation. For example, the counter moiety M may be $Li^+$, $K^+$, $NH_4^+$ or $Zn^{2+}$.

In some embodiments, the disclosure provides a method of producing a redox flow battery, comprising preparing the complexed iodine-based electrolyte and the counter electrolyte; providing two compartments and a separator therebetween; and injecting the complexed iodine-based electrolyte and the counter electrolyte into the two compartments, respectively. In further embodiments, the method comprises installing electrodes, wires, reservoirs and other parts commonly used in the art. In other embodiments, the complexed iodine-based electrolyte and counter electrolyte are prepared by dissolving or suspending active species into the solvent as described herein.

EXAMPLES

The following examples facilitate better understanding of the disclosure, and are not intended to limit the disclosure in any way. Unless otherwise specifically indicated, the test methods used in the following examples are conventional methods. Unless otherwise specifically indicated, the materials, reagents, etc. used in the following examples are commercially available reagents and materials. The plasmids are obtained through standard molecular cloning method.

General Procedure

Iodide and the complexing agent are dissolved in the solvent to prepare the complexed iodine-based electrolyte, and the counter specie is dissolved or suspended in the solvent to prepare the counter electrolyte, and then the prepared solutions are injected into corresponding compartments. Alternatively, iodide and the complexing agent together with the counter species are dissolved or suspended in the solvent, and the prepared solution is injected into corresponding compartments. Herein, all the substances are described above, and may be commercially available.

Example 1: Cyclic Voltammetry Test Using Aqueous Complexed Iodine-Based Electrolyte 0.1M $ZnI_2$, 0.1M $ZnI_2$+0.05M $ZnBr_2$, and 0.1M $ZnBr_2$ were used as electrolytes, and the redox flow battery was constructed in accordance with the description of FIG. 2.

Figure 3:
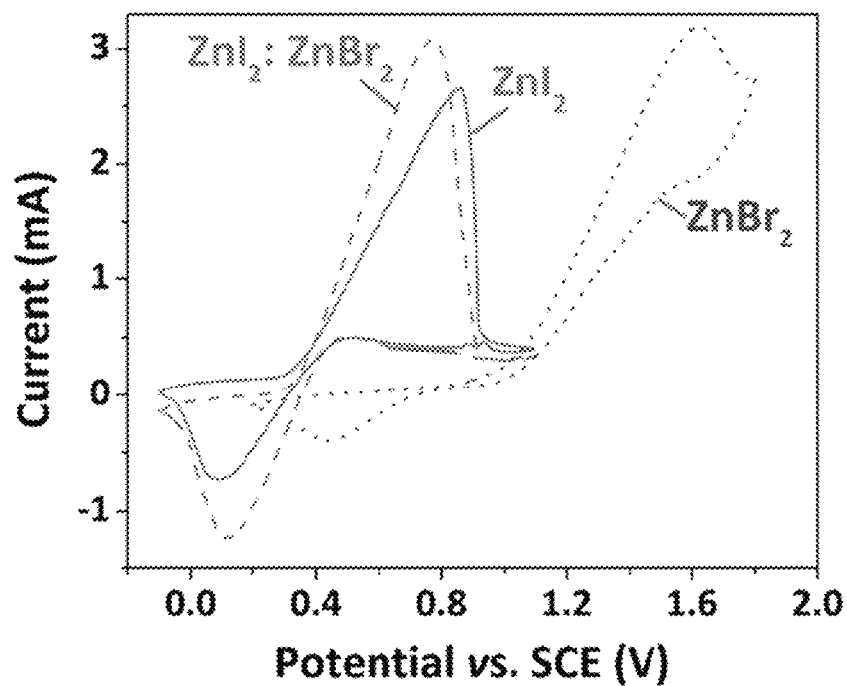
FIG. 3 shows cyclic voltammograms of the ZIBB system in accordance with one embodiment of the disclosure.

The test result is shown in FIG. 3, which shows the cyclic voltammogram (CV) of 0.1M $ZnI_2$, 0.1M $ZnI_2$+0.05M $ZnBr_2$ and 0.1M $ZnBr_2$ at the scan rate of 50 mV s$^{-1}$. The CV of bromide ions alone shows that the electrochemical oxidation peak potential of bromide ions (1.63 V vs. SCE) is significantly higher than that of iodide oxidation (0.86 V vs. SCE). In addition, the oxidation of bromide (1.0-1.80 V vs. SCE) is outside in the potential window of the oxidation of iodide (0.30-0.93 V vs. SCE).

Therefore, the oxidation of bromide ions can be mostly excluded in the electrochemistry with an appropriate cut-off control. It is also noted that hydrogen evolution is not observed in FIG. 3 throughout the potential range, which is benefit from the nearly neutral nature of the aqueous zinc halide solutions.

Example 2: Redox Flow Battery Using Aqueous Complexed Iodine-Based Electrolyte A solution comprising X M $ZnI_2$: X/2M $ZnBr_2$ (where X=1.5, 3.5 and 5.0) were prepared in accordance with the general procedure, and the redox flow battery (zinc/iodine-bromide (ZIBB) system) was constructed in accordance with the description of FIG. 2, in which two graphite felt electrodes (4 cm$^2$ for each) were used as both positive and negative electrodes, respectively; an aqueous mixture of $ZnI_2$ and $ZnBr_2$ was used as both positive and negative electrolytes, and a Nafion-115 membrane (Dupont, USA) was used as the separator.

Figure 4:
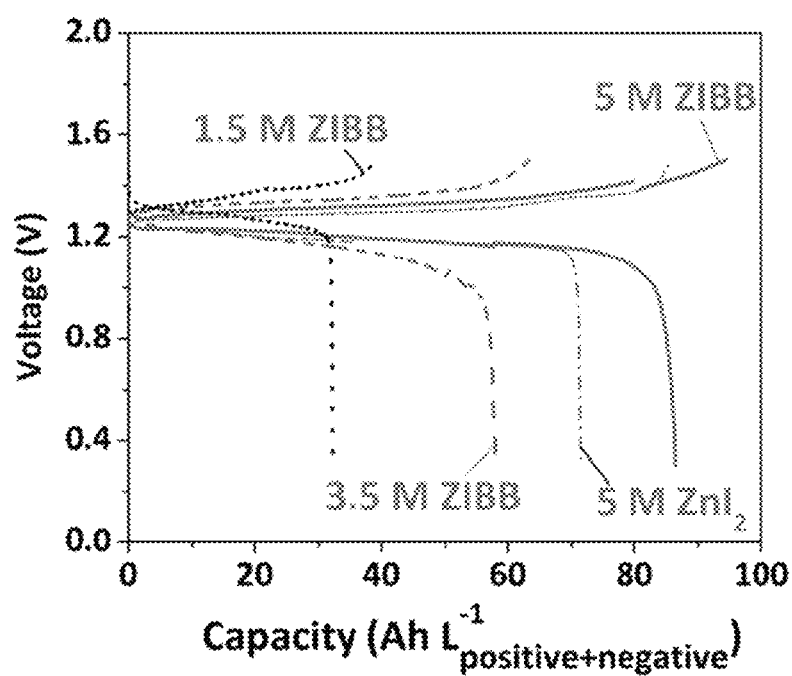
FIG. 4 shows galvanostatic voltage profiles of the ZIBB systems in accordance with one embodiment of the disclosure.

The test results are shown in FIG. 4, which shows galvanostatic voltage profiles of the ZIBB systems at various concentrations at a flow rate of 10 mL min$^{-1}$. The charge/discharge current density is 20 mA. In this example, bromide was used as the complexing agent to stabilize the iodine by forming iodine-bromide ions ($I_2Br^-$) in water. Therefore, the redox couple of the complexed iodine-based electrolyte was $I_2Br^-/(I^-+X)$ and provided a full cell with an electrode potential of 0.594 V vs. SHE.

In this example, upon charging, $I_2Br^-$ ions were generated in the positive electrolyte (Eqn. 6) while the zinc ions were reduced to form zinc metal on the negative electrode (Eqn. 7). Such process was accompanied by the movement of the zinc ions from the positive to negative chamber serving as the charge carrier. Upon discharging, the reverse reactions occurred.

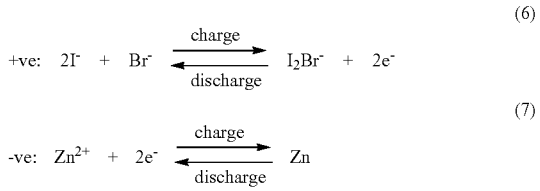

$$+ve: \quad 2I^- + Br^- \underset{discharge}{\overset{charge}{\rightleftharpoons}} I_2Br^- + 2e^- \quad (6)$$

$$-ve: \quad Zn^{2+} + 2e^- \underset{discharge}{\overset{charge}{\rightleftharpoons}} Zn \quad (7)$$

As shown in FIG. 4, the influence of the concentration of the active materials on the achievable capacity and energy density using three concentrations (X M $ZnI_2$: X/2M $ZnBr_2$, where X=1.5, 3.5 and 5.0) was evaluated. The discharge capacity of the ZIBB with 1.5M, 3.5M and 5.0M mixed electrolyte was c.a. 32, 58, and 87 Ah L$^{-1}_{positive+negative}$, respectively. By integrating the curve of voltage vs. capacity, the 1.5, 3.5, and 5.0M ZIBB system yielded a high energy density of 41, 67 and 101 Wh L$^{-1}_{positive+negative}$, respectively. The detailed characteristics of each case are also summarized in Table 1 below.

TABLE 1

| Concentration (M) | Discharge energy density (Wh L$^{-1}$) | OCV (V) | Charge mid-point voltage (V) | Discharge mid-point voltage (V) |
|---|---|---|---|---|
| 5M ZIB | 85 | 1.25 | 1.29 | 1.19 |
| 1.5M ZIBB | 41 | 1.30 | 1.38 | 1.28 |
| 3.5M ZIBB | 67 | 1.28 | 1.34 | 1.17 |
| 5M ZIBB | 101 | 1.25 | 1.32 | 1.19 |

Figure 5:
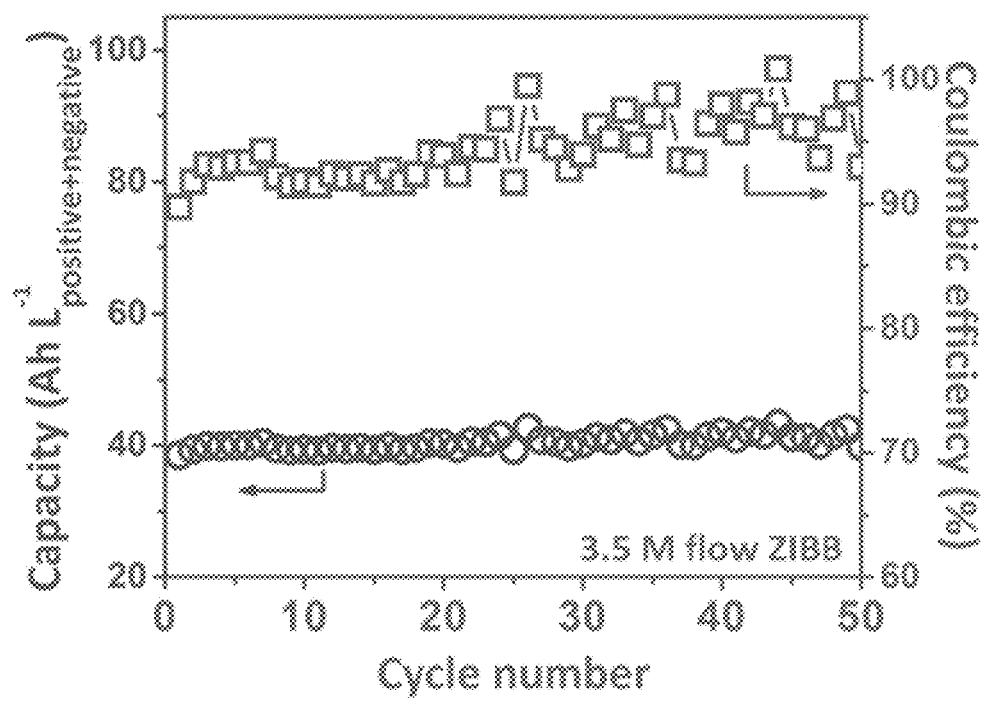
FIG. 5 shows cycling retention in Coulombic efficiency and discharge capacity of the ZIBB system in accordance with one embodiment of the disclosure.

In the example, the 3.5M ZIBB system was further tested, and the results are shown in FIG. 5, which shows cycling retention in Coulombic efficiency and discharge capacity of 3.5M ZIBB system with an electrolyte of 3.5M $ZnI_2$+1.75M $ZnBr_2$. The charge and discharge current was 40 mA and the flow rate was fixed at 10 mL min$^{-1}$. The system was operated at state-of-charge (SOC) of ~70%. The voltage profiles were stable over cycling with high capacity retention and Coulombic efficiency around 95%.

The battery evaluation on average efficiency over 50 cycles is summarized in Table 2 below. The Coulombic efficiency is defined as (average discharge capacity)/(average charge capacity) while voltage efficiency is defined as (average discharge voltage)/(average charge voltage). Energy efficiency equals to Coulombic efficiency×voltage efficiency.

TABLE 2

| System | Coulombic efficiency, % | Voltage efficiency, % | Energy efficiency, % |
|---|---|---|---|
| 3.5M ZIBB | 94 | 72 | 68 |

Figure 6:
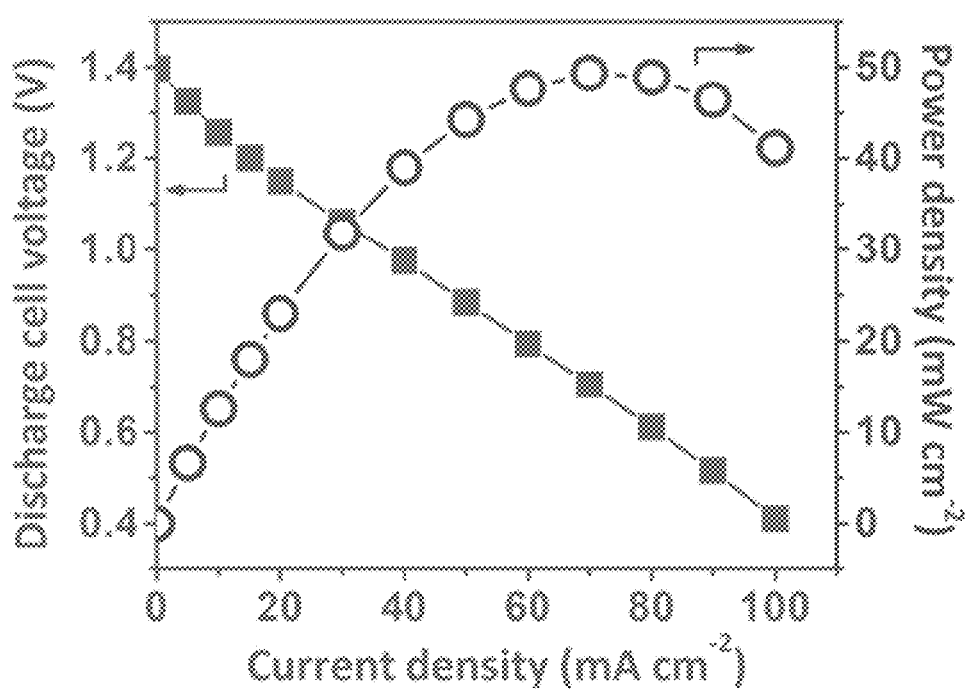
FIG. 6 shows discharge polarization curves of the ZIBB system in accordance with one embodiment of the disclosure.

In the example, the 3.5M ZIBB system was further tested, and the results are shown in FIG. 6, which shows discharge polarization curves of the 3.5M ZIBB system at 10 mL min$^{-1}$. The applied current densities were ranging from 5 to 100 mA cm$^{-2}$. The highest power density was 50 mW cm$^{-2}$ at the current density of 70 mA cm$^{-2}$.

Example 3: Redox Flow Battery Using Nonaqueous Complexed Iodine-Based Electrolyte A nonaqueous mixture of 2.5M LiI+1.25M LiBr in 0.2M LiClO$_4$-0.1M LiNO$_3$ in DOL:DME (1:1 v:v) was used as positive electrolyte while 1M LiClO$_4$-0.1M LiNO$_3$ in DOL:DME (1:1 v:v) was used as negative electrolyte. The redox flow battery (the lithium/iodine-bromide (LIBB) system) was constructed in accordance with example 2, in which a lithium conductive Li$_{1.5}$Al$_{0.5}$Ge$_{1.5}$(PO$_4$)$_3$ (LAGP) ceramic membrane was used as the separator. Moreover, a control system was similarly constructed expect that 2.5M LiI was used as electrolyte.

Upon charging, $I_2Br^-$ ions were generated in the positive electrolyte (Eqn. 6) while the Li$^+$ ions were reduced to form Li metal on the negative electrode (Eqn. 8).

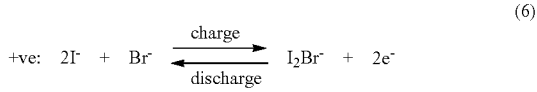

$$+\text{ve: } 2\text{I}^- + \text{Br}^- \underset{\text{discharge}}{\overset{\text{charge}}{\rightleftarrows}} \text{I}_2\text{Br}^- + 2e^- \quad (6)$$

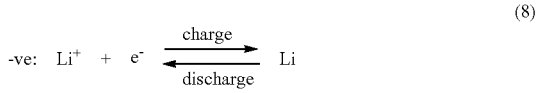

$$-\text{ve: } \text{Li}^+ + e^- \underset{\text{discharge}}{\overset{\text{charge}}{\rightleftarrows}} \text{Li} \quad (8)$$

Figure 7:
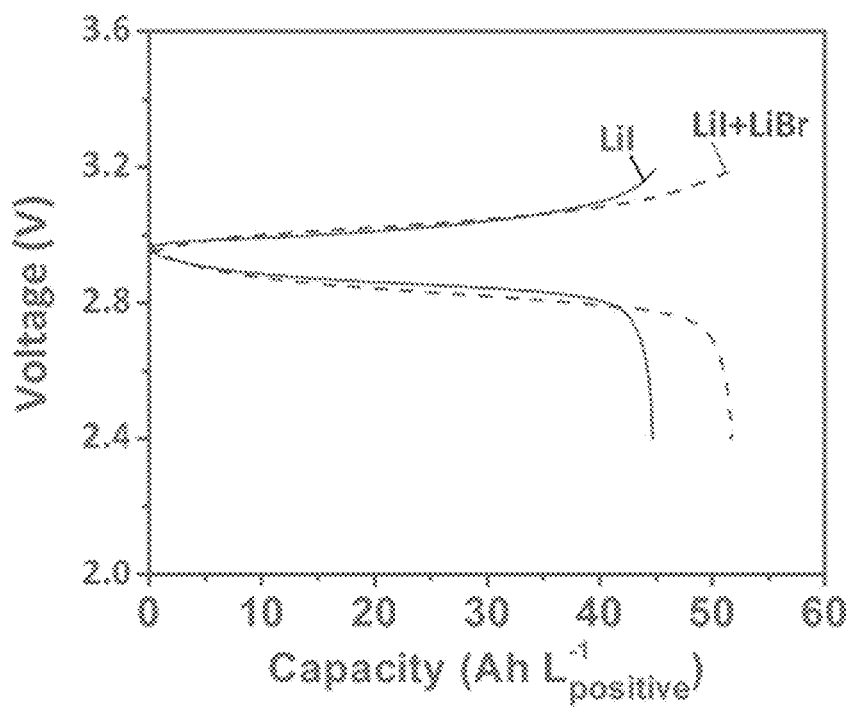
FIG. 7 shows galvanostatic voltage profiles of the LIBB systems in accordance with one embodiment of the disclosure as compared with a control system.

The test results are also shown in FIG. 7, which shows that a typical capacity of the LIBB system with 2.5M mixed posolyte (2.5M LiI+1.25M LiBr) at 0.113 mA was c.a. 53 Ah $L^{-1}_{posolyte}$ (Coulombic efficiency was c.a. 100%), while the control system using 2.5M LiI as positive (as the same as the negative electrolyte) yielded a capacity of c.a. 44 Ah $L^{-1}_{posolyte}$ (Coulombic efficiency was c.a. 100%). That means almost 20% increment in the capacity by adding bromide ions in the nonaqueous system.

Figure 8:
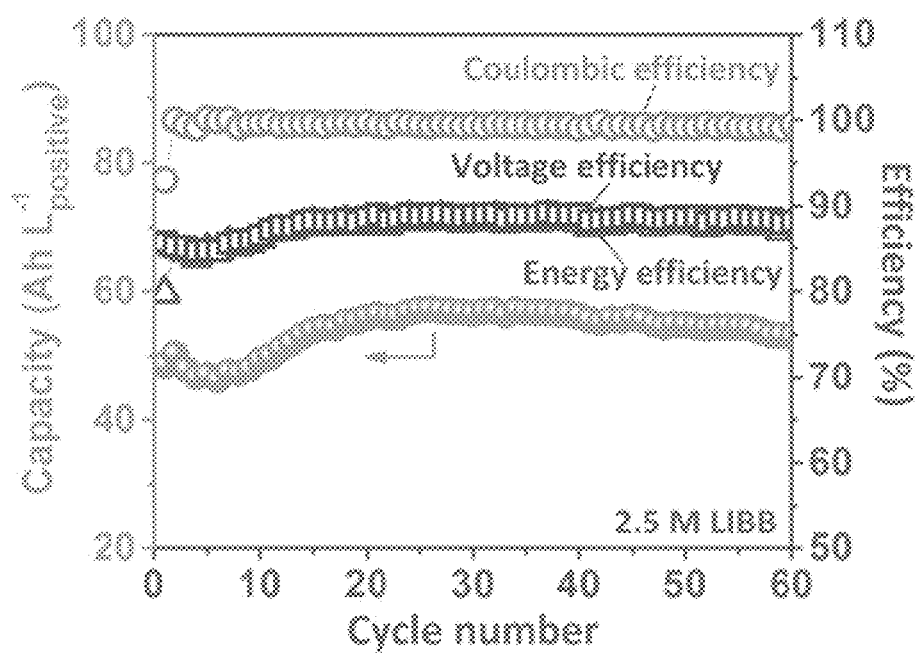
FIG. 8 shows cycling retention in efficiency and discharge capacity of the LIBB system in accordance with one embodiment of the disclosure.

The LIBB system was further tested, and the results are shown in FIG. 8, which shows cycling retention in efficiency and discharge capacity of the LIBB system with 2.5M LiI+1.25M LiBr as positive electrolyte. The charge/discharge current density was 0.5 mA. Both tests were operated at state-of-charge (SOC) of 100%. The cut-off voltages were 3.25 V and 2.5 V, respectively.

The LIBB system shows exceptional stability with superior Coulombic efficiency and energy efficiency over prolong cycling at 100% SOC. The battery evaluation in average efficiency over 60 cycles is summarized in Table 3 below. The Coulombic efficiency is defined as (average discharge capacity)/(average charge capacity) while voltage efficiency is defined as (average discharge voltage)/(average charge voltage). Energy efficiency equals to Coulombic efficiency×voltage efficiency.

TABLE 3

| System | Coulombic efficiency, % | Voltage efficiency, % | Energy efficiency, % |
|---|---|---|---|
| 2.5M LIBB | 99 | 88 | 87 |

Example 4: Redox Flow Battery Using Aqueous Complexed Iodine-Based Electrolyte and Porous Membrane A solution comprising X M $ZnI_2$ (where X=1~3) and povidone were prepared in accordance with the general procedure, and the redox flow battery (zinc/povidone-iodine (ZPIB) system) was constructed in accordance with the description of FIG. 2, in which two graphite felt electrodes (4 cm² for each) were used as both positive and negative electrodes, respectively; an aqueous mixture of X M $ZnI_2$ and povidone was used as positive electrolytes, while an aqueous solution of X M ZnI2 is used as negative electrolyte. A size selective membrane (PTFE, pore size <100 μm) was used as the separator.

In this example, upon charging, $I_3^-$ ions were generated in the positive electrolyte (Eqn. 9) while the zinc ions were reduced to form zinc metal on the negative electrode (Eqn. 7). The $I_3^-$ generated during charging forms non-covalent bonding with pyrrolidone group on povidone (PVP), so that cross-over of $I_3^-$ is limited and low-cost porous separator can be used. Such process was accompanied by the movement of the zinc ions from the positive to negative chamber serving as the charge carrier. The porous separator with high conductivity enables high power density. Upon discharging, the reverse reactions occurred.

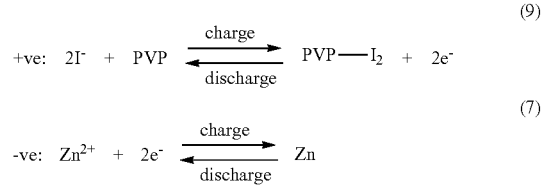

$$+\text{ve: } 2\text{I}^- + \text{PVP} \underset{\text{discharge}}{\overset{\text{charge}}{\rightleftarrows}} \text{PVP}\text{—}\text{I}_2 + 2e^- \quad (9)$$

$$-\text{ve: } \text{Zn}^{2+} + 2e^- \underset{\text{discharge}}{\overset{\text{charge}}{\rightleftarrows}} \text{Zn} \quad (7)$$

Example 5: Redox Flow Battery Using Nonaqueous Complexed Iodine-Based Electrolyte The redox flow battery (ZIBB system) was constructed in accordance with example 2, except that 6M $NH_4Br+3M$ $ZnI_2$ were used as negative electrolyte and 6M $NH_4Br+3M$ $ZnI_2$+15 wt % activated carbon complex agent were used as positive electrolyte. Moreover, a system using 6M $NH_4Br+3M$ $ZnI_2$ as positive and negative electrolyte was used as a control for comparison. FIG. 9 shows galvanostatic voltage profiles of such ZIBB system and the control. The charge/discharge current was 20 mA/cm², and the cut-off voltage of charging and discharging were 1.5 V and 0.4 V, respectively.

As can be seen from FIG. 9, the experimental group has $Br^-$ and activated carbon as the complex agent, and the control group contains only $Br^-$ complex agent. The ZIBB with activated carbon complex agent shows high coulombic efficiency over 90%, while the coulombic efficiency of the control group is less than 60% due to the serious cross-over. The data proves the ability of particle-type complex agent to reduce flow battery cost.

FIG. 10 shows UV-vis absorption spectrum of the ZIBB system and the control system. The charge/discharge current was 20 mA/cm². The state of charge (SOC) was calculated by the theoretical capacity of $ZnI_2$. The electrolyte at certain state of charge was extracted from the battery and diluted to 1/1200 of the original concentration, and the UV-vis absorption spectrum was tested with the diluted electrolyte. Polyiodide has light absorption peak of 280 and 350 nm.

To verify the adsorption effect of the carbon complex agent, a UV-vis absorption spectrum experiment was done on the ZIBB electrolyte in different state of charge (SOC), with and without activated carbon complex agent, as shown in FIG. 10. The electrolyte in the flow battery was charged to a certain SOC, extracted from the battery and diluted to test the UV-vis absorption. For the control group without carbon complex agent, two significant absorption peaks at 280 and 350 nm was observed at 40% and 80% SOC, which indicates the existence of free-polyiodide in electrolyte. For the experiment group with activated carbon complex agent, the absorption at 280 and 350 nm was negligible, which indicates that no free-polyiodide exists in the electrolyte.

Example 6: Redox Flow Battery Using Nonaqueous Complexed Iodine-Based Electrolyte The redox flow battery (ZIBB system) was constructed in accordance with example 2, except that 4M $NH_4Br+2M$ $ZnI_2$ were used as negative electrolyte, and 4M $NH_4Br+2M$ $ZnI_2$+22.5 wt % activated carbon+2.5 wt % N-vinyl-2-pyrrolidone complex agent were used as positive electrolyte. Two systems including Br— only and Br—+carbon were included as controls for comparison. One control system used 4M NH$_4$Br+2M ZnI$_2$ as positive and negative electrolyte, and the other control system used 4M NH$_4$Br+2M ZnI$_2$ as negative electrolyte and 4M NH$_4$Br+2M ZnI$_2$+22.5 wt % activated carbon complex agent as positive electrolyte. PTFE micro porous membranes were used as separators. The charge/discharge current was 20 mA/cm$^2$, and the cut-off voltage of charging and discharging were 1.5 V and 0.4 V, respectively.

As shown in FIG. 11, N-vinyl-2-pyrrolidone (PVP) complex agent further improved the battery compared to Br$^-$ and carbon particle. FIG. 11 shows the galvanostatic voltage profiles of 4M ZIBB using porous membrane. The experimental group has Br$^-$ and N-vinyl-2-pyrrolidone-carbon composite (PVP-C) as the complex agent, and the two control groups contain (1) only Br$^-$ complex agent and (2) Br$^-$ plus carbon particle, respectively. The ZIBB with PVP-C complex agent shows the best capacity, energy efficiency and coulombic efficiency (95.7%).

While a number of embodiments have been shown and described, it will be apparent to those skilled in the art that various changes and modifications may be made without departing from the invention in its broader aspects. The appended claims, therefore, are intended to cover all such changes and modifications as they fall within the true spirit and scope of the invention.

What is claimed is:

1. A complexed iodine-based electrolyte, comprising an iodide ion, an iodine molecule, a complexing agent and a solvent, wherein the complexing agent comprises a moiety X and a counter moiety M, in which the moiety X forms complexed ions I$_2$X with the iodine molecule, during charging process of the complexed iodine-based electrolyte, and the complex ion I$_2$X is reduced and decomposes into I$^-$ and free X during discharging process of the complexed iodine-based electrolyte, wherein the moiety X is selected from the group consisting of a hetero-halide ion, a pseudohalide ion, a complexing molecule and a combination thereof.

2. The complexed iodine-based electrolyte of claim 1, wherein the hetero-halide ion is selected from the group consisting of F$^-$, Cl$^-$, Br$^-$, At$^-$ and a combination thereof, and wherein if the hetero-halide ion is Br$^-$, the complexing agent is a combination of Br$^-$ with a complexing molecule.

3. The complexed iodine-based electrolyte of claim 1, wherein the pseudohalide ion is selected from the group consisting of SCN$^-$, OCN$^-$, CN$^-$, SeCN$^-$, TeCN$^-$, N$_3^-$, Co(CO)$_4^-$, C(CN)$_3^-$, CS$_2$N$_3^-$ and a combination thereof.

4. The complexed iodine-based electrolyte of claim 1, wherein the complexing molecule is selected from the group consisting of activated carbon, polyvinylpyrrolidone, polysaccharides, carboxymethyl starch sodium, polyoxyethylene or their derivatives and a combination thereof.

5. The complexed iodine-based electrolyte of claim 4, wherein the complexing molecules form a particle with a diameter of 0.1 μm to 10 μm.

6. The complexed iodine-based electrolyte of claim 1, wherein the solvent is selected from the group consisting of water, acetone, ethanol, dimethyl sulfoxide, acetonitrile, 1,3-dioxolane, 1,2-dimethoxyethane, diglyme, ethyl acetate, toluene, hexane, propylene carbonate, ethylene carbonate, dimethyl carbonate, diethyl carbonate and a combination thereof.

7. A redox flow battery, comprising the complexed iodine-based electrolyte of claim 1, and a counter active electrode or active electrolyte that is dissolved or stably suspended in the solvent.

8. The redox flow battery of claim 7, wherein the counter active electrode or active electrolyte is selected from the group consisting of V$^{2+}$/V$^{3+}$, Zn/Zn$^{2+}$, Zn/ZnO, Cu/Cu$^{2+}$, Ni/Ni$^{2+}$, K/K$^+$, Na/Na$^+$, Ce$^{3+}$/Ce$^{4+}$, Mg/Mg$^{2+}$, Al/Al$^{3+}$, S$^{2-}$/S$^{4-}$, MH$_x$/MH$_{x-1}$, Pb/Pb$^{2+}$, Pb$^{2+}$/Pb$^{4+}$, H$_2$/H$^+$, O$_2$/H$_2$O, O$_2$/O H$^-$, (2,2,6,6-tetramethylpiperidin-1-yl)oxyl/hydroxylamine (2,2,6,6-tetramethylpiperidin-1-yl)oxyl, and a combination thereof, wherein M is a metal cation.

9. The redox flow battery of claim 7, wherein the redox flow battery further comprises an acid or a base, in which the acid is selected from the group consisting of HCl, H$_2$SO$_4$, H$_3$PO$_4$, HNO$_3$, H$_2$CO$_3$, C$_6$H$_5$COOH and a combination thereof, and the base is selected from the group consisting of NaOH, LiOH, KOH, NH$_4$OH and a combination thereof.

10. The redox flow battery of claim 7, wherein the redox flow battery comprises a single cell or a stack of cell, in which each cell comprises two half-cells, wherein one half-cell comprises the complexed iodine-based electrolyte, and the other half-cell comprises the counter active electrode or active electrolyte, and wherein the two half-cells are separated by an ion-exchange membrane, a porous membrane or a solid-state ionic conductive ceramic.

11. The redox flow battery of claim 7, wherein the redox flow battery in which both two half-cells use aqueous electrolyte has an energy density of more than 101 Wh/L$_{positive+negative}$.

12. The redox flow battery of claim 7, wherein the redox flow battery in which at least one half-cell uses nonaqueous electrolyte has an energy density of 140-750 Wh/L$_{positive+negative}$.

13. A complexing agent for a complexed iodine-based electrolyte, wherein the complexing agent comprises a moiety X and a counter moiety M, in which the moiety X forms complexed iodide ions I$_2$X during charging process of the complexed iodine-based electrolyte, and forms free X during discharging process of the complexed iodine-based electrolyte, wherein the moiety X is selected from the group consisting of a hetero-halide ion, a pseudohalide ion, a complexing molecule and a combination thereof.

14. The complexing agent of claim 13, wherein the hetero-halide ion is selected from the group consisting of F$^-$, Cl$^-$, Br$^-$, At$^-$ and a combination thereof, and wherein if the hetero-halide ion is Br$^-$, the moiety X is a combination of Br$^-$ with a complexing molecule.

15. The complexing agent of claim 13, wherein the pseudohalide ion is selected from the group consisting of SCN$^-$, OCN$^-$, CN$^-$, SeCN$^-$, TeCN$^-$, N$_3^-$, Co(CO)$_4^-$, C(CN)$_3^-$, CS$_2$N$_3^-$ and a combination thereof.

16. The complexing agent of claim 13, wherein the complexing molecule is selected from the group consisting of activated carbon, polyvinylpyrrolidone, polysaccharides, carboxymethyl starch sodium, polyoxyethylene or their derivatives and a combination thereof.

17. The complexing agent of claim 16, wherein the complexing molecules form a particle with a diameter of 0.1 μm to 10 μm.

* * * * *